United States Patent [19]

Frost et al.

[11] Patent Number: 5,191,008
[45] Date of Patent: Mar. 2, 1993

[54] PROCESS FOR THE PRODUCTION OF LATEXES BY THE SELECTIVE MONOMER ADDITION

[75] Inventors: Howard H. Frost, Calhoun, Ga.; Pamela S. Graham, Stow, Ohio; Ronald D. Fiedler, Atwater, Ohio; Ramesh N. Gujarathi, Akron, Ohio

[73] Assignee: The Goodyear Tire & Rubber Company, Akron, Ohio

[21] Appl. No.: 779,666

[22] Filed: Oct. 21, 1991

[51] Int. Cl.$^5$ .................................................. C08F 2/16
[52] U.S. Cl. ..................................... 524/460; 524/458; 523/201; 526/65
[58] Field of Search ........................... 524/460; 526/65

[56] References Cited

U.S. PATENT DOCUMENTS

| | | | |
|---|---|---|---|
| 4,480,078 | 10/1984 | Gujarathi | 524/460 X |
| 4,559,374 | 12/1985 | Senyek et al. | 524/460 X |
| 4,613,633 | 9/1986 | Sekiya et al. | 524/460 X |

Primary Examiner—Joseph L. Schofer
Assistant Examiner—J. M. Reddick
Attorney, Agent, or Firm—Bruce J. Hendricks

[57] ABSTRACT

The present invention relates to a free radical emulsion polymerization process. The latex is prepared by polymerizing (a) at least one conjugated diene, (b) at least one non-carboxylic vinyl aromatic or aliphatic comonomer selected from the group consisting of styrene, α-methyl styrene, p-methyl styrene, vinyl toluene, acrylonitrile, methacrylonitrile, vinylidene chloride, ethyl acrylate, butyl acrylate, vinyl pyridine, methylmethacrylate, hexylacrylate, 2-ethyl hexyl acrylate or mixtures thereof, and (c) at least one ethylenically unsaturated carboxylic acid monomer selected from the group consisting of acrylic acid, methacrylic acid, maleic acid, fumaric acid, β-carboxyethyl acrylate, itaconic acid or mixtures thereof. The process of the present invention is characterized by (1) polymerizing a first portion of non-carboxylic comonomer in the absence of any conjugated diene to a conversion of 60 to 90 percent to form a partially polymerized latex; (2) introducing to the partially polymerized latex the total amount of conjugated diene to be polymerized; (3) copolymerizing the conjugated diene with the unreacted non-carboxylic comonomer in the partially polymerized latex to a conversion of 75 to 90 percent of unreacted conjugated diene and noncarboxylic comonomer; (4) introducing the remaining portion of non-carboxylic comonomer to be polymerized to the latex having a conversion of 75 to 90 percent; and (5) copolymerizing the remaining portion of non-carboxylic comonomer in the latex with the unreacted conjugated diene latex to form a latex having a conversion of from 90 to 100 percent.

19 Claims, No Drawings

PROCESS FOR THE PRODUCTION OF LATEXES BY THE SELECTIVE MONOMER ADDITION

BACKGROUND OF THE INVENTION

Carboxylated latex, for example styrene-butadiene-itaconic acid terpolymers, have been prepared by a variety of methods. For example, U.S. Pat. No. 4,480,078 discloses a continuous emulsion polymerization process for producing carboxylated styrene-butadiene latices characterized in that only a portion of the primary monomers are charged to the first reaction zone followed by subsequent injection of the remaining portion of the primary monomers to the following reaction zone in an overall process using two or more reactors. According to this method, a portion of the conjugated diene and the non-carboxylic acid monomer are added to the first reaction zone with the remaining portion of each primary monomer being charged thereafter. Unfortunately, this method still contributes to the formation of 4-phenylcyclohexene (4-PCH).

U.S. Pat. No. 3,969,432 relates to a process of copolymerizing a vinyl aromatic monomer with from about 0.5 to about 6 percent of a conjugated diene monomer based on the total weight of the monomers. Initially the vinyl aromatic monomer is copolymerized by a free radical mechanism with about 15 to about 70 percent by weight of the total quantity of the conjugated diene monomer. Thereafter, the remainder of the conjugated diene, 85 to 30 percent by weight, is added to the copolymerization system and the polymerization reaction is continued. Unfortunately, the undesirable characteristic of this process is that the Diels-Alder reaction can take place to form 4-PCH in large amounts.

SUMMARY OF THE INVENTION

The present invention relates to a method for decreasing the formation of Diels-Alder reaction products such as 4-PCH. The present method is characterized by the selective addition of the reactive monomers so that the formation of such undesirable by-products are reduced.

DETAILED DESCRIPTION OF THE PREFERRED INVENTION

There is disclosed a free radical emulsion polymerization process for the production of a latex comprising polymerizing (a) at least one conjugated diene, (b) at least one non carboxylic vinyl aromatic or aliphatic conoomer selected from the group consisting of styrene, α-methyl styrene, para-methyl styrene, vinyl toluene, acrylonitrile, methacrylonitrile, vinylidene chloride, ethyl acrylate, butyl acrylate, vinyl pyridine, methylmethacrylate, hexylacrylate, 2 ethyl hexyl acrylate or mixtures thereof, and (c) at least one ethylenically unsaturated carboxylic acid monomer selected from the group consisting of acrylic, methacrylic acid, maleic acid, funaric acid, β-carboxyethyl acrylate, itaconic acid, comprising (1) polymerizing a first portion of non-carboxylic comonomer in the absence of any conjugated diene to a conversion of 60 to 90 percent to form a partially polymerized latex; (2) introducing to the partially polymerized latex; (2) introducing to the conjugated diene to be polymerized; (3) copolymerizing the conjugated diene with the unreacted non-carboxylic comomner in the partially polymerized latex to a conversion of 75 to 90 percent of unreacted conjugated diene and noncarboxylic comonmer; (4) introducing the remaining portion of non-carboxylic comonomer to be polymerized to the latex having a conversion of 75 to 90 percent; and (5) copolymerizing the remaining portion of non-carboxylic comonomer in the latex with the unreacted conjugated diene latex to form a latex having a conversion of from 90 to 100 percent.

The process of the present invention has numerous advantages over the current methods of production. For example, the process of the present invention results in a decreased formation of Diels-Alder reaction products such as 4-PCH. Unfortunately, attempts to remove significant levels of 4-PCH contributes to the expense of production.

The reaction mixtures or ingredients (sometimes referred to as polymerization recipes) that are used in the process of the present invention are comprised of (1) water which is added in sufficient amount to provide latex having a solids content of 49 to 54 percent by weight after polymerization, (2) primary monomers, (3) monomeric carboxylic acids, (4) chain transfer agents, (5) nonpolymerizable substituents such as (a) electrolytes, (b) chelating agents, (c) emulsifiers, and (6) initiators.

The primary monomers in the reaction mixture of the present invention are comprised of conjugated dienes preferably having 4 to 10 carbon atoms and one or more noncarboxylic comonomers. Examples of conjugated diene type monomers are butadiene, isoprene, 2,3-dimethyl butadiene, ,13- butadiene, 2 -methyl -1,3- butadiene, 2-ethyl1-,3-butadiene, 1,3 -penta diene, 2-methyl 1,3pentadiene, 1,3-hexadiene, 2-phenyl-1,3-butadiene, 3,4-dimethyl 1,3-h heptadiene, 1,3-octadiene, 4,5-diethyl 1,3-octadiene, 3-methyl 1,3-pentadiene, 4-methyl-1,3-pentadiene or mixtures thereof. Substituted conjugated dienes such as chloro or cyano butadiene may be used if desired. Butadiene is the preferred conjugated diene. The conjugated diene comprises 20 to 60 percent by weight of the total monomers in the final product. Stated in another way, the carboxylated product is derived from about 20 to about 60 percent by weight from the conjugated diene. Preferably, the conjugated diene comprises 38 to 42 percent by weight of the total monomers in the final product.

The noncarboxylic comonomers may be vinyl aromatic compounds, such as styrene, α-methyl styrene, para-methyl styrene and vinyl toluene, or an aliphatic monomer, such as unsaturated nitrile, for example acrylonitrile or methacrylonitrile. Other vinyl monomers such as vinylidine chloride, ethyl acrylate, butyl acrylate, methyl methacrylate, hexyl acrylate, 2-ethyl hexyl acrylate may be used. Styrene is the preferred noncarboxylic comonomer. The amount of noncarboxylic comonomer comprises 40 to 80 percent by weight of total monomers in the final product. Stated another way, the carboxylated polymer is derived from about 40 to 80 percent by weight of noncarboxylic comonomers. Preferably, the noncarboxylic comonomer comprises 58 to 62 percent by weight of the total monomers in the final product.

Representative of the ethylenically unsaturated carboxylic acid monomers that can be used in the process of this invention are acrylic acid, methacrylic acid, maleic acid, fumaric acid and particularly itaconic acid. Preferably, itaconic acid is used. The amount of carboxylic acid monomer used may range from about 0.5 to 10 percent by weight based on total monomers. Stated in the alternative, the carboxylated polymer is derived from about 0.5 to 10 percent by weight of the carboxylic acid monomer. Preferably, the amount of carboxylic acid monomer ranges from about 1.5 to 2.5 percent by weight based on total monomers. The carboxylic acid monomer used is preferably supplied to the reaction zones in the free acid form.

Other functional or specialty monomers in addition to carboxylic acid monomer may be included in the process of this invention to effect certain polymerization and application properties. Among the types of functional monomers which have been traditionally employed are those containing hydroxyl, amide, methylolamide, ester, amine, epoxy, aldehyde and halogen functional groups. Typical of these specialty monomers are hydroxy ethyl and propyl acrylates and methacrylates, acrylamide, methacrylamide, N-methylol acrylamide, mono and di esters of polycarboxylic acids such as methyl and n-butyl itaconate, n-dibutyl itaconate, dibutyl maleate and fumarate and dimethylaminoethyl methacrylate. In addition, monomers such as I (1.isocyanate-1-methylethyl)-3-(1-methylethenyl)benzene, tetrahydro-N.{1-methyl1-[3-(1-methylethenyl)phenyl]ethyl}2-oxo-1H-pyrrolo-1-carboxamide and hexahydro-N [3-(1-methylethenyl)phenyl]ethyl}-2-oxo-1H-azepine-1-carboxamide may be used. Functional monomers in the amount of 0.1 to 5 percent of total monomer in the reaction mixture can be added. When a plurality of reaction zones, i.e., three are used, these functional monomers may be added either to the first, second or third reactor depending upon the desired distribution required to influence certain polymerization and application properties.

Modifiers or chain transfer agents used in the process of the invention are short or long-chain alkyl mercaptans and are used to control the molecular weight of the polymers. Representative of the mercaptans that can be used in the process of the present invention are n-octyl mercaptan, n-nonyl mercaptan, tertiary-nonyl mercaptan, n-decyl mercaptan, n-dodecyl mercaptan, sec-dodecyl mercaptan, tert-dodecyl mercaptan, tert tetradecyl mercaptan, tert-hexadecyl mercaptan, sec-hexadecyl mercaptan, n-hexadecyl mercaptan or mixtures of mercaptans. It is possible to employ any of such modifiers individually or in combination contingent to achieving desired polymer properties. With the monomeric systems of this invention, it is preferable that a modifier be present. Chain transfer agents are conventionally used at a level of 0.2 to 0.8 phm (parts per one hundred parts of monomers). The preferred chain transfer agent is tertiary dodecyl mercaptan. It may either be premixed with the primary monomers or charged separately. It is also preferred that the modifier be split in the same proportion as the non-carboxylic comonomer is split and Charged to the respective reaction zone.

The process of the present invention also contemplates the incorporation of polymerizable antioxidants. These antioxidants have shown great potential in the stabilization of oxidizable organic materials due to their nonextractability and nonvolatility. These antioxidants as monomers are polymerized with one or more comonomers so as to have the antioxidant moiety chemically attached to the polymer structure. The following list is representative of polymerizable antioxidants that can be used in the process of this invention and is not intended to be limited: N.(4-anilinophenyl) acrylamide, N.(4-anilinophenyl)methacrylamide, N-(4-anilinophenyl) maleimide, N.(4-anilinophenyl) itaconimide, 4-anilinophenyl acrylate, 4-anilinophenyl methacrylate, and 3-N-(4'-anilinophenyl)amino-2-hydroxy-propyl methacrylate.

These polymerizable antioxidants are known in the art and are covered by numerous U.S. patents. They are incorporated in conventional antioxidant amounts known to those skilled in the art. These polymerizable antioxidants can be considered functional or specialty monomers and may be used accordingly.

The preparation of a polymer latex employs many different nonpolymerizable components whose function to a great deal is interdependent. The present invention contemplates the use of these prior known nonpolymerizable components generally employed in emulsion polymerization technology. Thus, the aqueous phase in the reaction mixture may include chelating agents, electrolytes, emulsifying agents or surfactants and similar ingredients.

Conventional chelating agents may be included in the reaction mixture. Representative chelating agents known to those skilled in the art include the sodium salt of N,N-di(2-hydroxyethyl)glycine, the pentasodium salt of diethylenetriamine pentacetic acid, the trisodium salt of N (hydroxyethyl)-ethylenediamine triacetic acid, the trisodium salt of nitrilotriacetic acid and the sodium salt of ethylene diamine tetracetic acid. Conventionally, the amount of chelating agent will range from about 0.05 to about 0.25 parts per hundred monomer (phr).

The electrolytes suitable for use in the reaction mixture of this invention are those which are traditionally used in the latex industry. Typical of these electrolytes are tri and tetra sodium and potassium pyrophosphates and phosphates, sodium, potassium and ammonium carbonates, bicarbonates and sulfates. More specifically, tetrasodium pyrophosphate is preferred. The concentration of electrolyte in the reaction mixture is that minimum necessary for achieving their desired optimum effect. The amount of electrolytes which are conventionally used range from about 0.05 to about 0.5 phm.

A listing of various emulsifiers and detergents which may be useful in the present process is given in the book "McCutcheon's Emulsifiers and Detergents 1981 Annuals", which is incorporated by reference in its entirety.

The emulsifier system in the reaction mixture may be a combination of one or more surfactants anionic, cationic, non-ionic or anphoteric class of surfactants. Typical of some of the anionic emulsifying agents are alkyl sulfonate, alkyl aryl sulfonates, condensed naphthalene sulfonates, alkyl sulfates, ethoxylated sulfates, phosphate esters and esters of sulfosuccinic acid. Representative of these surfactants are sodium alpha-olefin ($C_{14}$-$C_{16}$) sulfonates, alkali metal or ammonium dodecylbenzene sulfonate, disodium dodecyl diphenyloxide disulfonate, disodium palmityl diphenyloxide disulfonate, sodium, potassium or ammonium linear alkyl benzene sulfonate, sodium lauryl sulfate, ammonium alkyl phenolethoxylate sulfate, ammonium or sodium lauryl ether sulfate, ammonium alkyl ether sulfate, sodium alkyl ether sulfate, sodium dihexyl sulfosuccinate, sodium dicyclohexylsulfosuccinate, sodium diamyl sulfosuccinate, sodium diisobutylsulfosuccinate, disodium ethoxylated nonyl phenol half ester of sulfosuccinic acid, tetra sodium N, (1,2-dicarboxyethyl)-N-octadecyl sulfosuccinate, disodium isodecyl sulfosuccinate, sodium bistridecyl sulfosuccinate, sodium salt of alkyl aryl polyether sulfate, lauryl alcohol ether sulfate, sodium salt of condensed naphthalene sulfonic acid, complex phosphate ester of ethylene oxide adduct and mixtures thereof. A total concentration of the emulsifier system is normally included in the reaction mixture in an amount of about 0.3 to 8 phm. It has been found particularly desirable that the surfactant system of this invention be employed more suitably at the active level of 0.3 to 2 phm for optimum latex properties.

Water soluble free radical initiators or catalysts employed in the process of this invention are those that are traditionally used in emulsion polymerization. Typically free radical initiators are persulfates, water soluble peroxides and hydroperoxides; more specifically, sodium, potassium and ammonium persulfate, hydrogen peroxide, t-butyl hydroperoxide, cumene hydroperoxide, para-menthane hydroperoxide and peroxy carbonates. Other water soluble initiators of similar decomposition mechanism may be used if desired.

Ammonium persulfate, a preferred Catalyst system at a concentration of 0.2 to about 0.8 phm is premixed with a portion of the electrolyte and water and this aqueous solution of the catalyst is charged to the bottom or the first reactor. A portion of the catalyst solution may be charged in the latter stages of polymerization to achieve substantial reduction of residual unreacted monomers in the latex.

The process may be carried out in a batch or semi-continuous process, however, due to economic and production reasons the process is preferably carried out on a continuous basis. Two or more reaction zones, preferably three reaction zones, connected in series are used. By reaction zone is meant a reaction vessel that will withstand the superatmospheric pressures involved and also provides a means of keeping the particular reaction zones at the appropriate temperature.

Preferably, the process should be carried out in a chain consisting of three "continuous stirred-tank reactors" (CSTR) connected in series. The polymerization is conducted preferably at pH of 1.5 to 2.5 and under constant pressure of 130-210 psig controlled by the back pressure regulator provided in the system. Constant temperature is maintained in each zone during polymerization. Preferably, the first zone is maintained at 68° C.-85° C., the second zone at 75° C.-90° C. and the third zone at 65° C.80° C.

Different reaction components are supplied at the appropriate charge rate so that the total residence time which corresponds to the reaction time is 9 to 15 hours (3 to 5 hours per reactor). Lower polymerization temperatures of 60° C. to 75° C. may be used if desired by extending the reaction time.

Various feed streams in the process containing different reaction components are preferably supplied at the base of a zone in a chain. Functional monomer feed stream, however, can be supplied from the top of a zone through the dip-leg pipe extended to the bottom of the zone.

When the process is carried out in a continuous mode with three reaction zones, the partially polymerized latex is withdrawn from the first reaction zone continuously at a rate equal to the total rate of addition of the mixture of reagents to the first reaction zone. In such continuous mode, the partially polymerized latex is withdrawn from the second reaction zone continuously at a rate equal to the total rate of addition of the partially polymerized latex and additional reagents to the second reaction zone. Similarly, the latex is withdrawn from the third reaction zone continuously at a rate equal to the total rate of addition of the partially polymerized latex and additional reagents to the third reaction zone.

The buffer stream consisting of a mixture of water, emulsifiers, electrolyte, chelating agent, monomeric polycarboxylic acid and a portion of the non-carboxylic comonomer and the modifier may be mixed in an inline static mixer while being charged continuously at the base of the first reaction zone through a common header. Premixing of these reaction components helps to pre-emulsify the non-carboxylic comonomer. The catalyst solution is preferably charged separately at the base of the first reaction zone. The reaction mixture in the first zone is maintained until a conversion of from 60% to 90% and thereafter the conjugated diene is introduced from the bottom. Preferably, the partially polymerized latex is removed from the top of the first reaction zone and introduced to the bottom of the second reaction zone before the conjugated diene is introduced. After the conjugated diene has been introduced, the conjugated diene is copolymerized with unreacted non-carboxylic comonomer remaining in the partially polymerized latex. Preferably, the copolymerization is the second reaction zone. The copolymerization is conducted until a conversion of 75 to 90 percent is achieved. A conversion of from about 85 to about 90 percent is preferred.

After the copolymerization has proceeded to the desired conversion of from 75 to 90 percent, the remaining portion of non-carboxylic comonomer is introduced to the latex. Preferably, the remaining portion of non-carboxylic comonomer is introduced after the partially polymerized latex has been removed from the second reaction zone and fed to the third reaction zone. After the remaining portion of non-carboxylic comonomer has been introduced, polymerization is continued until a conversion of from about 90 to 100 percent. Preferably, the polymerization is conducted until a conversion of from about 94 to about 98 percent is achieved. The zone is partially neutralized and subjected to steam-stripping to remove residual unreacted monomers, however, much of the incentive to strip is removed by the low levels of 4-PCH. Post additives such as antioxidants, dispersants and bactericides may be added to the latex prior to storage.

As mentioned before, the non-carboxylic comonomer is introduced in two portions, before and after total addition of the conjugated diene to achieve desired significant improvement in the formation of 4-PCH. Preferably, the noncarboxylic comonomer is split between the weight ratio of 75/25 to 95/5. Stated in the alternative, 75 to 95 weight percent of all the non-carboxylic comonomer is added prior to the introduction of any conjugated diene. Preferably, from 75 to 95 weight percent of the total non-carboxylic comonomer (first portion) is added to the first of three reactors and 25 to 5 weight percent of the total non-carboxylic comonomer (remaining portion) is added to the third of three reactors.

The conjugated diene is added after the first portion of non-carboxylic comonomer is added. When a three reaction zone is used, the conjugated diene is preferably added to the second reaction zone.

All of the ethylenically unsaturated carboxylic acid monomer may be added at one time or be added in two or more portions. For example, when a three stage reaction zone is used, all of the ethylenically unsaturated carboxylic acid monomer may be added to the first reaction zone or in both the first and second reaction zone. When the addition of ethylenically unsaturated carboxylic acid monomer is added to the first and second reaction zone, preferably from about 50 to about 75 weight percent of the total weight of ethylenically unsaturated carboxylic acid monomer is added to the first reaction zone with the balance, 25 to 50 weight percent being added to the second reaction zone.

EXAMPLE 1

The following example is intended to illustrate and not limit the scope of the present invention. The following example in accordance with the present invention was carried out on a bench scale. The equipment consisted of three 316 stainless steel reactors connected in series. The first and second reactor were each one gallon and the third reactor was 2 gallons. Each reactor was equipped with an agitator and jacketed for the circulation of heating and cooling medium which was controlled automatically to maintain desired polymerization temperature. Constant pressure higher than the autogenous pressure of the reaction mixture was also maintained with the back. pressure regulator installed on the latex overflow outlet line on the last reactor.

Various solutions containing different reaction ingredients were premixed in the make-up or charge tanks. Continuous charge streams were metered into the respective zones. The styrene stream was divided and charged continuously to the first and third reaction zone whereas the butadiene was charged continuously to the second reaction zone.

The buffer stream/itaconic acid and the styrene stream designated for the first zone were premixed inline and charged through a common line connected at the bottom of the first zone. The stabilized persulfate solution (stream 2) was charged through a separate line also connected at the bottom of the first zone. The butadiene stream (stream 3) designated for the second zone was injected at the base of the second zone and the styrene stream was injected at the base of the third zone. The reaction mixture was passed from the first to the second and finally to the third zone after a certain residence time in each zone, which is determined by charge rates and the zone capacity. Three-stage polymerized latex was continuously removed from the top of the last zone and subjected to further processing, i.e., steam stripping. A carboxylated styrene-butadiene latex based on the following formulation was prepared by the process of this invention.

TABLE I

| Ingredient | | Active Parts by Weight (phm) |
|---|---|---|
| Zone 1 | | |
| Stream 1 | Buffer solution[1] | 72.555 |
| | Itaconic Acid | 1.75 |
| Stream 2 | Stabilized Persulfate Solution[2] | 7.325 |
| Stream 3 | Styrene | 54.00 |
| | t-dodecyl mercaptan | .229 |
| Zone 2 | | |
| Stream 1 | Buffer Solution[1] | 4.577 |
| Stream 2 | Stabilized Persulfate Solution[2] | 3.049 |
| Stream 3 | Butadiene | 34.25 |
| | t-dodecyl mercaptan | 0.123 |
| Zone 3 | | |
| Stream 1 | Styrene | 10.0 |

[1]The buffer solution consisted of water, the sodium salt of HEDTA, surfactant system and tetrasodium pyrophosphate.
[2]The stabilized persulfate solution consisted of water, ammonium persulfate and tetrasodium pyrophosphate.

Before commencing polymerization, the first and second reaction zones were filled partially (approximately 85 percent of the reaction zone volume) with a carboxylated latex to provide for a heel and the first reaction zone was heated to approximately 79° C. Continuous polymerization was started by charging the three streams to the first reaction zone. All of the flows were maintained at a charge rate to provide for a total residence time in all three reaction zones of 11 hours. Polymerization was conducted under a pressure of 190 psig and moderate mixing was maintained in each of the three zones. The first reaction zone was maintained at approximately 79° C., the second reaction zone at approximately 80° C. and the third reaction zone from 68° to 75° C.

The latex thus produced was partially neutralized to a pH of 6.0-6.5 with ammonium hydroxide and defoamer was added prior to steam stripping. The latex was further neutralized to a pH of 8.0-9.0 after steam stripping and the other post additives such as dispersant, antioxidant and bactericide were added. Polymerization and physical properties were as follows:

TABLE II

| | Seed Latex | Reactor 1 | Reactor 2 | Reactor 3 |
|---|---|---|---|---|
| After 27 Hours of Operation | | | | |
| 4-PCH (ppm) | 183 | ND | ND | 40 |
| Solids % | — | 36.4 | 41.0 | 45.0 |
| Conversion % | — | 86 | 80 | 84 |
| After 40 Hours of Operation | | | | |
| 4-PCH (ppm) | — | ND | ND | ND |
| Solids % | — | 35.5 | 42.0 | 46.0 |
| Conversion % | — | 84 | 82 | 85 |

As can be seen above, 4-PCH levels were at non-detectable levels after normal polymerization time. Conventionally, 4-PCH levels may range from about 100 ppm to as high as 250 ppm on a wet basis.

What is claimed is:

1. A free radical emulsion polymerization process for the production f a latex comprising polymerizing (a) at least one conjugated diene, (b) at least one non-carboxylic vinyl aromatic or non-carboxylic vinyl aliphatic comonomer selected from the group consisting of styrene, α-methyl styrene, vinyl toluene, acrylonitrile, methacrylonitrile, vinylidene chloride, ethyl acrylae, butyl acrylate, vinyl pyridine, methylmethacrylate, hexylacrylate, 2-ethyl hexyl acrylate or mixtures thereof, and (c) at least one ehtylenically unsaturated carboxylic acid monomer selected from the group consisting of acrylic acid, methacrylic acid, maleic acid, fumaric acid, itaconic acid mixtures thereof, comprising (1) polymerizing a first portion of non-carboxylic vinyl aromatic or non-carboxylic vinyl aliphatic comonomer in the absence of any conjugated diene to a conversion of 60 to 90 percent to form a partially polymerized latex; (2) introducing to the partially polymrized latex the total amount of conjugated diene to be polymerized; (3)copolymerizing the conjugated diene with the unreacted non-carboxylic vinyl aromatic or non-carboxylic vinyl aliphatic comonomer in the partially polymerized latex to a conversion of 75 to 90 percent of unreacted conjugated diene and noncarboxylic vinyl aromatic or non-carboxylic vinyl aliphatic comonomer; (4) introducing the remaining portion of non-carboxylic vinyl aromatic or non-carboxylic vinyl alipahtic comonomer to be polymerized to the latex having a conversion of 75 to 90 percent; and (5) copolymerizing the remaining portion of non-carboxylic vinyl aromatic or non-carboxylic vinyl aliphatic comonomer in the latex with the unreacted conjugated diene latex.

2. The process of claim 1 wherein 75 to 95 percent by weight of the total weight of non-carboxylic vinyl aromatic or non-carboxylic vinyl alipahtic comonomer that is to be polymerized is added prior to the addition of said conjugated diene.

3. The process of claim 2 wherein from 80 to 90 percent by weight of the total weight of non-carboxylic vinyl aromatic or non-carboxylic vinyl aliphatic comonomer that is to be polymerized is added prior to the addition of said conjugated diene.

4. The process of claim 1 wherein the polymerization process is conducted in three separate reaction zones.

5. The process of claim 4 wherein the first portion of non-carboxylic vinyl aromatic or non-carboxylic vinyl aliphatic comonomer is added to the first of three reaction zones.

6. The process of claim 4 wherein said conjugated diene is added to the second of three reaction zones.

7. The process of claim 4 wherein the remaining portion of non-carboxylic vinyl aromatic or non-carboxylic vinyl aliphatic comonomer is added to the third of three reaction zones.

8. The process of claim 4 wherein all of said carboxylic acid monomer that is to be reacted is added to the first of three reaction zones.

9. The process of claim 4 wherein a portion of said carboxylic acid monomer is added to the first zone and the remaining portion of carboxylic acid monomer is added to the second zone.

10. The process of claim 1 wherein (1) the first portion of non-carboxylic vinyl aromatic or non-carboxylic vinyl aliphatic comonomer is polymerized in a first reaction zone to a converstion of 60 to 90 percent; (a) is copolymerized with the unreacted component (b) to a conversion of 85 to 90 percent in the second reaction zone; (3) the remaining portion of non-carboxylic vinyl aromatic or non-carboxylic vinyl aliphatic comonomer is copolymerized with the unreacted conjugated diene to a conversion of from 94 to 98 percent in the third reaction zone.

11. The process of claim 1 wherein said conjugated diene is selected from the group consisting of butadiene, isoprene, 2,3-dimethyl butadiene.

12. The process of claim 1 wherein said conjugated diene is butadiene.

13. The process of claim 1 wherein said non-carboxylic vinyl aromatic or non-carboxylic vinyl alipahtic comonomer is styrene.

14. The process of claim 1 wherein said ethylenically unsaturated carboxylic acid monomer is itaconic acid.

15. The process of claim 10 wherein the partially polymerized latex is withdrawn from the first reaction zone continuously at a rate equal to the total rate of addition of the mixture of reagents to the first reaction zone.

16. The process of claim 10 wherein the partially polymerized latex is withdrawn from the second reaction zone continuously at a rate equal to the total rate of addition of the partially polymerized latex and additional reagents to the second reaction zone.

17. The process of claim 10 wherein the latex is withdrawn from the third reaction zone continuously at a rate equal to the total rate of addition of the partially polymerized latex and additional reagents to the third reaction zone.

18. The process of claim 1 wherein sufficient conjugated diene, non-carboxylic vinyl aromatic or non-carboxylic vinyl aliphatic comonomer and ethylenically unsaturated carboxylic acid monomer are polymerized to provide a carboxylated polymer which is 20 to about 60 percent by weight derived from the conjugated diene, 40 to about 80 percent by weight is derived from the non-carboxylic vinyl aromatic or non-carboxylic vinyl alipahtic comonomer and 0.5 to 10 weight percent is derived from the ethylenically unsaturated carboxylic acid monomer.

19. The process of claim 1 wherein from about 38 to 42 weight percent is derived from the conjugated diene, 58 to 62 weight percent is derived from the non-carboxylic vinyl aromatic or non-carboxylic vinyl aliphatic comonomer and 1.5 to 2.5 weight percent is derived from the ethylenically unsaturated carboxylic acid monomer.

* * * * *